(12) United States Patent
Narayana et al.

(10) Patent No.: US 7,533,130 B2
(45) Date of Patent: May 12, 2009

(54) USER BEHAVIOR REPORTING BASED ON PRE-AGGREGATED ACTIVITY DATA

(75) Inventors: Koushik Deepak Narayana, San Francisco, CA (US); John Nathan Boyd, Sunnyvale, CA (US); Paul Sokha Kim, Morgan Hill, CA (US); Vishwanath Tumkur Ramarao, Garden Grove, CA (US)

(73) Assignee: Yahoo! Inc., Sunnyvale, CA (US)

( * ) Notice: Subject to any disclaimer, the term of this patent is extended or adjusted under 35 U.S.C. 154(b) by 302 days.

(21) Appl. No.: 11/612,994

(22) Filed: Dec. 19, 2006

(65) Prior Publication Data

US 2008/0147731 A1  Jun. 19, 2008

(51) Int. Cl.
*G06F 17/00* (2006.01)

(52) U.S. Cl. .................... 707/104.1; 707/101; 707/102; 707/103 R

(58) Field of Classification Search ............... 707/1–10, 707/100–104.1, 200–206
See application file for complete search history.

(56) References Cited

U.S. PATENT DOCUMENTS 6,698,013 B1 * 2/2004 Bertero et al. ............... 717/127

\* cited by examiner

*Primary Examiner*—Isaac M Woo
(74) *Attorney, Agent, or Firm*—Beyer Law Group LLP

(57) ABSTRACT

User behavior relative to particular web pages is reported on. The user behavior is represented by historical raw transaction data for the users with respect to the web pages. A collection of the historical raw transaction data is processed, including aggregating the historical raw transaction data and storing the aggregated historical raw transaction data. A report query is received and the aggregated historical raw transaction data is processed based on the report query. A report is caused to be generated based on the result of processing the aggregated historical raw transaction data.

39 Claims, 12 Drawing Sheets

USER BEHAVIOR REPORTING BASED ON PRE-AGGREGATED ACTIVITY DATA

BACKGROUND

A web page is a resource available via a network, such as the Internet, usually formatted with HTML or secure HTML and including hypertext links to enable navigation from one page or section to another. Web pages are typically viewed using a web browser. Web pages may contain a variety of elements that are visible in the web browser, such as text, graphics, audio, interactive multimedia content, and applets. Web pages also contain content that cannot be viewed in the browser, such as scripts, meta tags, Cascading Style Sheets, comments, and so on.

A website is a collection of web pages, typically stored in a single folder or within related subfolders on a web server. A website typically also includes an index page, which is a file with a special name, defined in the web server's configuration. When a visitor requests a web page at a particular URL, the web server associated with that URL will look for an index page and serve that to the user's browser. If no index page exists, a listing of the folder's contents, or an error page will be displayed (depending on other web server settings).

The proliferation of web pages available via the Internet creates an increasing competition among web page developers to design their web pages so that they are easy to use. Typically, web pages contain both information that users may be looking for and advertisements promoting various kinds of products or services. Often, the advertisements are supplied to the web pages by third parties that are different from the web page developers. In return for displaying these advertisements, the web page developers are compensated by the third parties. The compensation amount is often related to how many users visit the web page, and how many users view or click on the advertisements.

As a result, it can be important for web page developers to be able to monitor the traffic flow both on individual web pages and on groups of web pages with sufficient granularity, in order to get a better understanding about the users' behavior and what effects various redesigns of web pages have on the users' behavior. While there is a great amount of raw user data available representing users' behavior with respect to web pages, it generally takes a lot of processing power and time to glean useful information from the raw data. Furthermore, because of the processing power and time requirement, it is difficult to interact with the data in a timely manner.

SUMMARY

In accordance with an aspect, user behavior relative to particular web pages is reported on. The user behavior is represented by historical raw transaction data for the users with respect to the web pages. A collection of the historical raw transaction data is processed, including aggregating the historical raw transaction data and storing the aggregated historical raw transaction data. A report query is received and the already-aggregated historical raw transaction data is processed based on the report query. A report is caused to be generated based on the result of processing the aggregated historical raw transaction data.

BRIEF DESCRIPTION OF THE DRAWINGS

FIG. 4 illustrates a report of data of traffic inflow for a particular page of a particular property.

FIG. 5 illustrates a report of data of traffic outflow from a property, as a whole.

DETAILED DESCRIPTION

The inventors have realized that, given the usefulness of particular types of reports on user behavior, it is advantageous to preprocess the raw user data such that the preprocessed data can be processed to generate reports in a timely manner. Furthermore, because the processing power necessary to generate the reports is reduced then it can be possible to proliferate the reporting capability out to more users.

Figure 1:
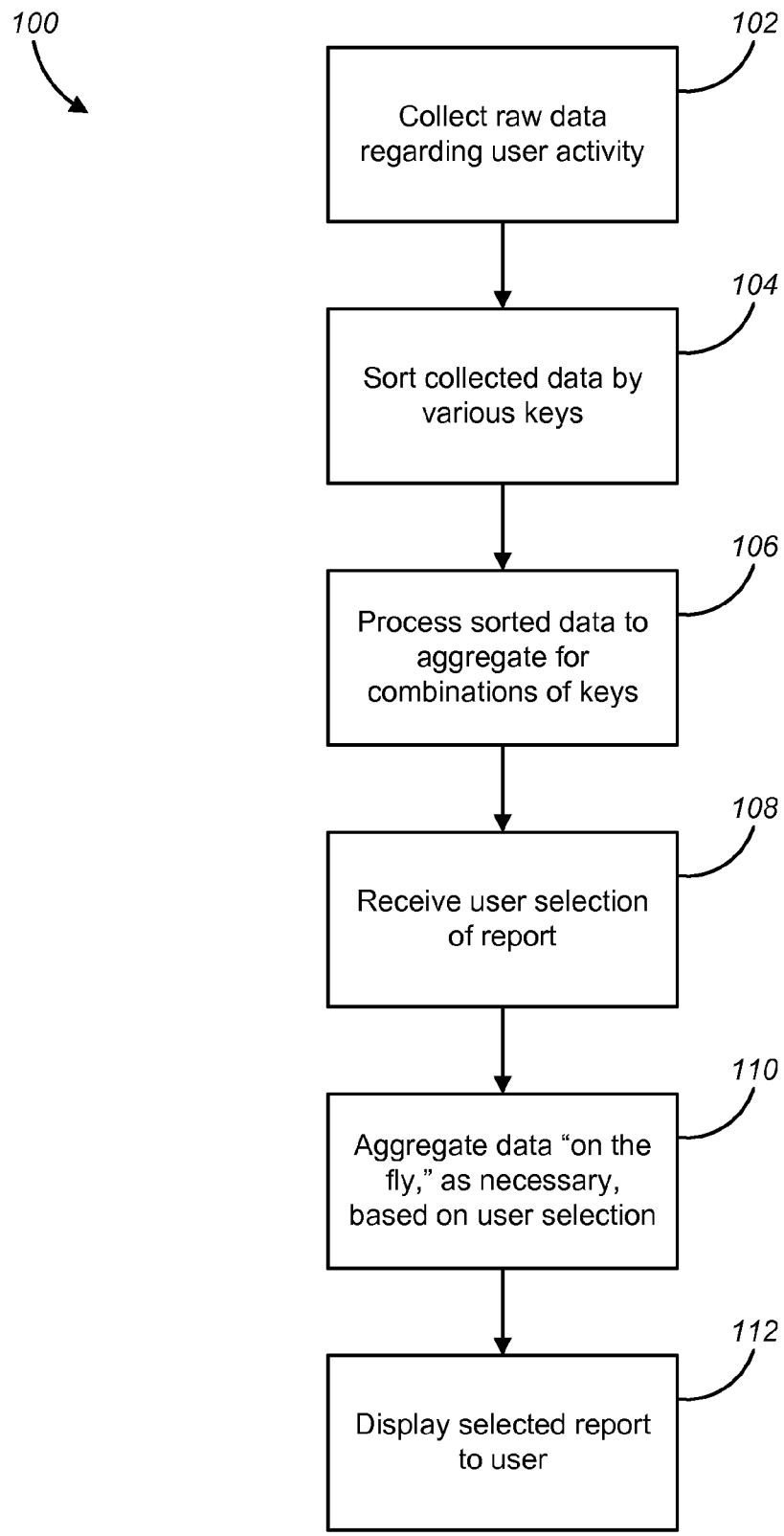
FIG. 1 is a flowchart illustrating a process to generate reports for analyzing web page traffic.
Figure 2:
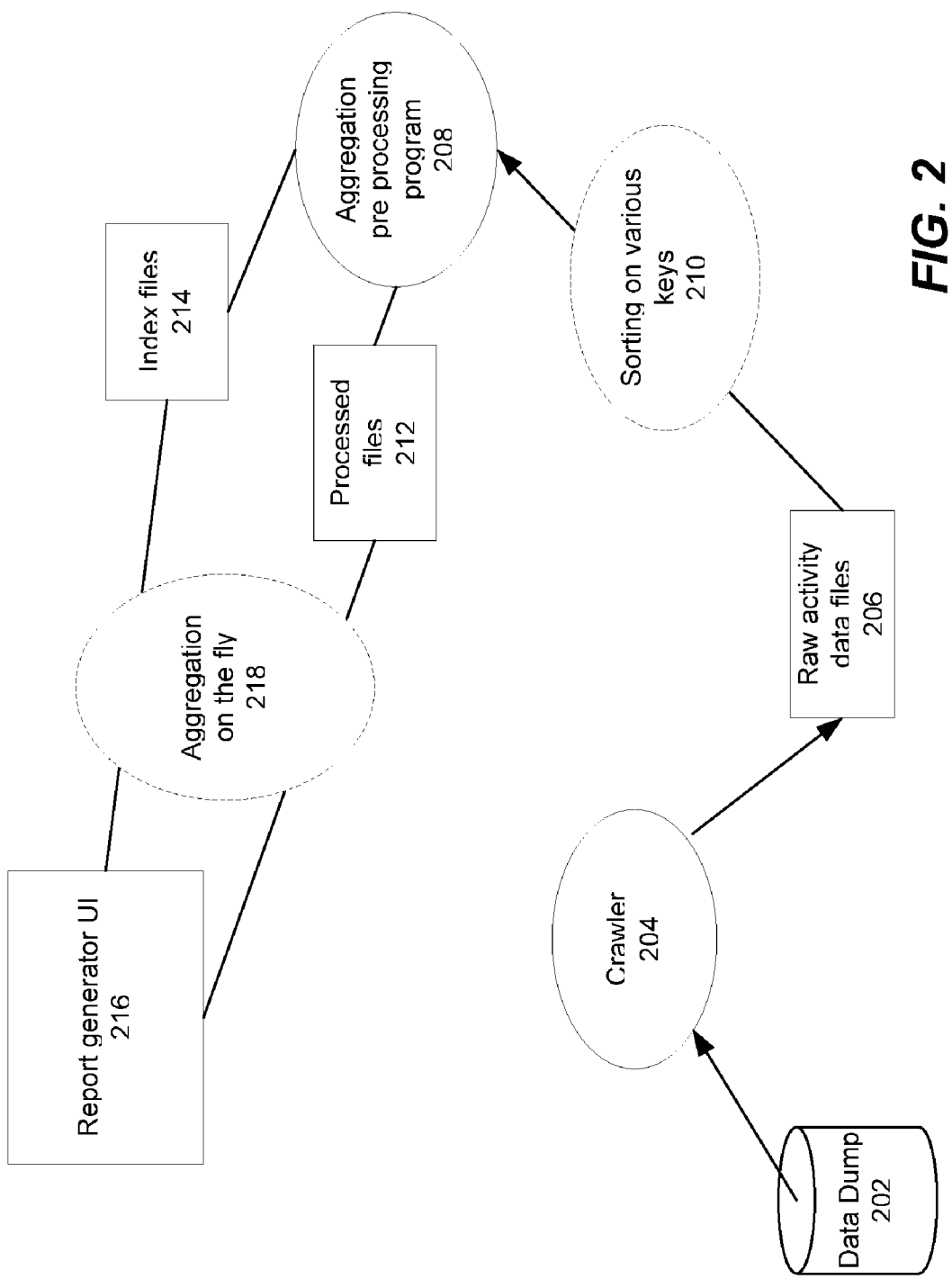
FIG. 2 is a simplified block diagram illustrating the architecture of a system in which the FIG. 1 process may take place.

FIG. 1 is a flowchart illustrating a process to generate reports for analyzing web page traffic. FIG. 2 is a simplified block diagram illustrating the architecture of a system in which the FIG. 1 process may take place.

As shown in FIG. 1, a process for analyzing web page traffic may start by collecting raw activity data regarding the users (step 102). In FIG. 2, the raw activity data collection is shown by the data dump 202, data crawler 204 and raw activity data files 206. The raw activity data may represent, for example, the different actions each individual user is taking with respect to a web page, such as what pages a user views, what links a user follows, and what advertisements a user views. In some implementations, only the advertisement viewing activity is registered, since the advertisement viewing is often what generates income for the web page provider.

There are various ways in which the collection of raw activity data may be achieved. In some implementations, the collection of raw activity data regarding the users is accomplished by using one or more cookies. Cookies are a common mechanism for tracking the activities of users across single or multiple web sites. When a user requests a web page through his or her web browser, the server sends a cookie to the browser along with the web page. Technically, the cookie can be described as an arbitrary piece of data chosen by the web server. When the web browser requests another page at some later point in time, the cookie is returned unchanged to the web server with the request. This allows a state (i.e., a memory of previous events) to be introduced into the otherwise stateless HTTP transaction.

Without cookies or some other way of maintaining a state, each retrieval of a web page or component of a web page would be only an isolated event, mostly unrelated to all other views of the pages of the same site. By returning a cookie to a web server, the browser provides the server a means of connecting the current page view with prior page views. Other than being set by a web server, cookies can also be set by a script in a language such as JavaScript, if the script language is supported and enabled by the web browser. The cookie setter can specify a date for the cookie to be removed. If no date is specified, the cookie is typically removed once the user quits his or her browser. As a result, specifying a date can cause a cookie to survive across sessions. For this reason, cookies with an expiration date are referred to as persistent cookies. Cookies can be used to track a variety of user-related data, such as whether a user is logged in to a web site, the user's computer environment (i.e., computer configuration, web browser, and so on) and who the user is (if the user has registered before on the web site) so on.

In addition to the raw data collected using cookies, additional information can be collected using other means, such as time stamps and IP addresses, which allows the web page provider to identify, for example, what country the user is located in and calculate a local time at which a user activated a link or an advertisement. In many implementations, all of this information is collected and stored using sophisticated and powerful data warehouse mechanisms.

In one example, the following attributes and metrics are collected as the raw activity data:
 Attributes
 Source pageid
 Dest pageid (for flow reports)
 Registration information
 Hour of the day
 User country
 User screen resolution (for user media information)
 Network type (for user media information)
 Media player versions (for user media information)
 Browser (for user media information)
 Operating system (for user media information)
 Ad position (for ad drilldown reports)
 Ad category (for ad drilldown reports)
 Ad type (for ad drilldown reports)
 Metrics
 Total Pageviews
 Total Unique cookies
 Total timespent
 Total ad views (for ad drilldown reports)
 Total ad clicks (for ad drilldown reports)

At step 104, in FIG. 1, the collected raw activity data is sorted on different keys. In FIG. 2, the sorting step is represented by the bubble 210. The keys on which the collected raw activity data are sorted generally correspond to a type of report that may be ultimately requested.

Examples of keys on which the raw activity data may be sorted are listed below, categorized by report type:
 Flow Reports
 Source pageid
 Dest pageid (for flow reports)
 Registration information
 Hour of the day
 User country
 General Reports
 Source pageid
 Registration information
 Hour of the day
 User country
 User Media Profile Reports
 Source pageid
 Registration information
 Hour of the day
 User country
 User screen resolution (for user media information)
 Network type (for user media information)
 Media player versions (for user media information)
 Browser (for user media information)
 Operating system (for user media information)
 Ad Drill Down Reports.
 Source pageid
 Registration information
 Hour of the day
 User country
 Ad position (for ad drilldown reports)
 Ad category (for ad drilldown reports)
 Ad type (for ad drilldown reports)

At step 106, in FIG. 1, the sorted data is processed to pre-aggregate the data for combinations of keys. In FIG. 2, the pre-aggregation step is represented by the bubble 208, and the pre-aggregated data is represented by box 212. Examples of the pre-aggregation are listed below, categorized by report type:
 Flow Reports
 Total Pageviews
 Total Unique Cookies
 Average pageviews per cookie
 General Reports
 Total Pageviews
 Total timespent
 Average pageviews per cookie
 Average timespent per cookie
 User Media Profile Reports
 Total Pageviews
 Average pageviews per cookie
 Ad Drill Down Reports.
 Total ad views (for ad drilldown reports)
 Total ad clicks (for ad drilldown reports)

With the raw activity data pre-aggregated in a manner that corresponds to the report queries, it is then quite feasible to receive report queries (step 108 in FIG. 1; report query generator UI 216 in FIG. 2), further aggregate the data on the fly (step 110 in FIG. 1; bubble 218 in FIG. 2), and still to respond to the report queries in a very timely manner. At step 112, the report is displayed.

Furthermore, as illustrated in FIG. 2, in some examples, the pre-aggregated data is indexed (box 214), and the index may be used to make aggregation on the fly (bubble 218) more efficient.

Figure 12:
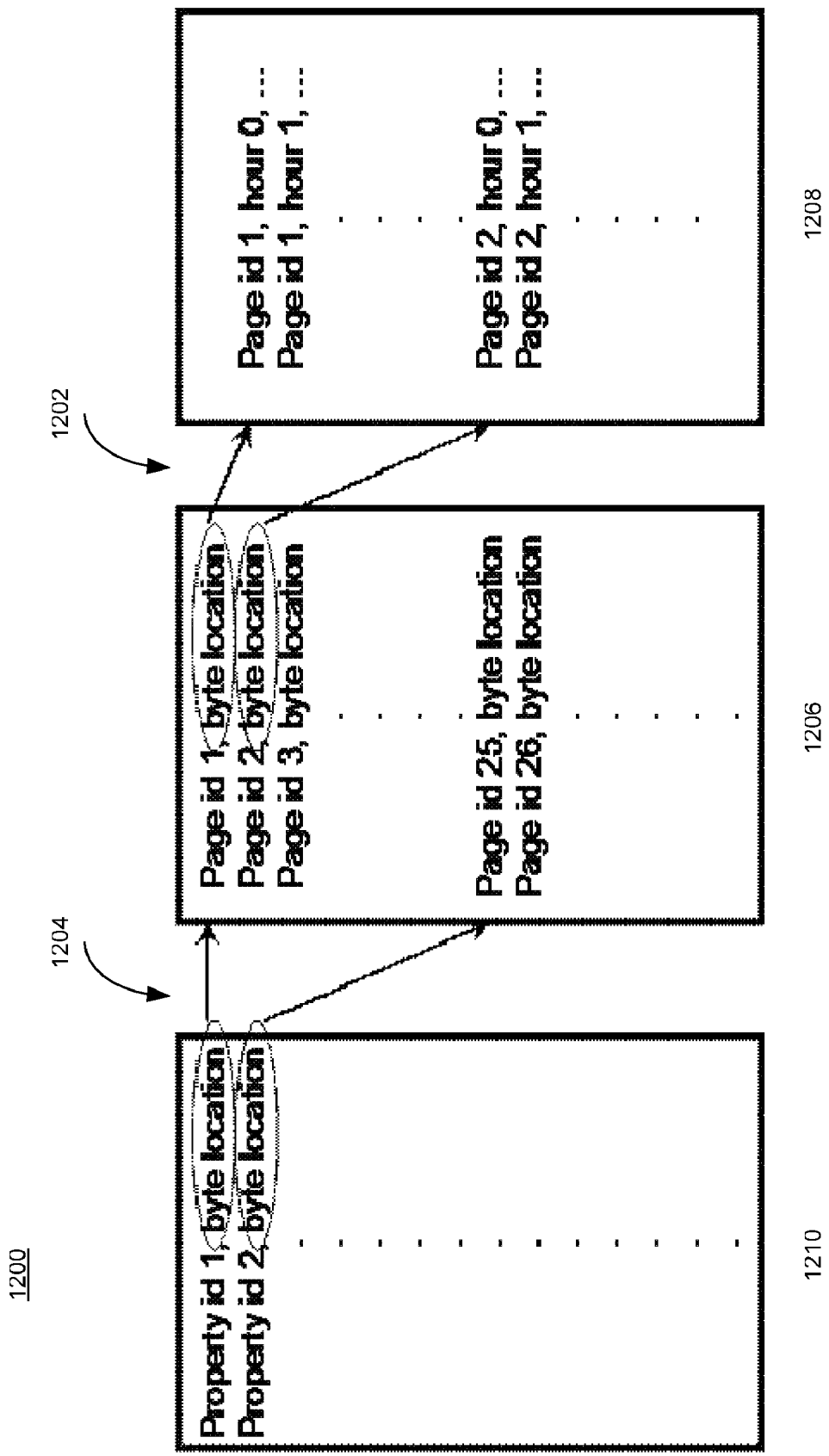
FIG. 12 schematically illustrates an example of the pre-aggregated data indexed by page id's.

For example, the pre-aggregated data may be indexed by page ids. In one example, schematically illustrated in FIG. 12, an index 1200 includes a first level 1202 in which each page id is mapped to the byte location of where the information for the page id will start in the processed file (see 1206/1208). This can help speed up the search for the data for a given page id. Also, the index may include a hierarchy that indicates where page ids for individual pages are mapped to their respective property. This gives freedom to abstract the indexes further. That is, a second level of indexing 1204 may be employed in which each property id maps to the start of the group of page ids belonging to that property in the page id index file (see 1210/1206).

As an example of a report query, the user may make a request such as "For each hour in a 24-hour period, display which advertisements had the most clicks, and organize the data by user country and user type." In this example, assuming that the raw activity data has been pre-aggregated on an advertisement by advertisement basis, by time of day in hour increments, and by user country and user type, it is a fairly simple matter to determine, on the fly, which advertisement had the most clicks for a particular hour and to present the "number of click" information categorized by user country and user type.

Figure 3:
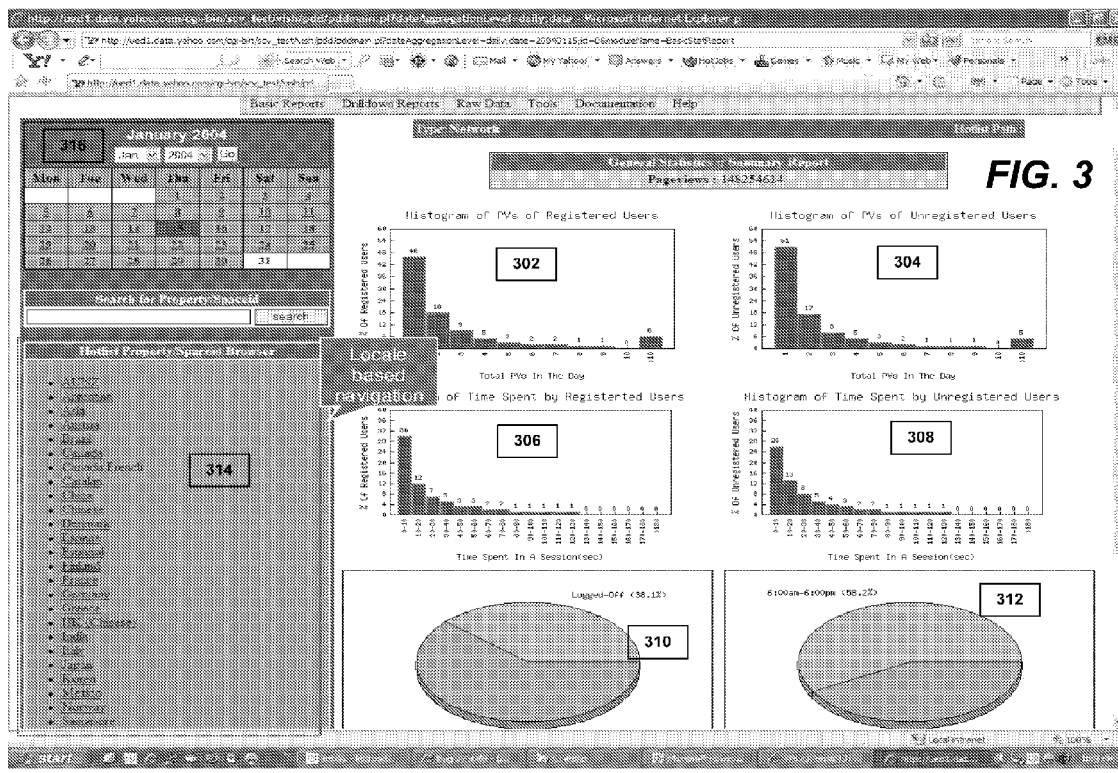
FIG. 3 illustrates a report of general statistics for "all properties."

We now discuss some example reports, with reference to screen shots. FIG. 3, for example, illustrates general statistics for "all properties" (e.g., all properties for a particular service provider). That is, a property is characterized by a set of related PageIDs. Typically a property is associated with a product or a service, such as a mail service, an instant messaging service, a news service, and so on. Properties may also be associated with a particular country such as, for example, an e-mail property for France that is different from an e-mail property for the United States.

The general statistics illustrated in the FIG. 3 example report include a histogram of page views of users, by registered users 302 and unregistered users 304 for an entire day (in the FIG. 3 example, for Jan. 15, 2004, as selected in portion 316 of the FIG. 3 report) for all of the properties on a network. The FIG. 3 example report also includes a histogram of time spent by users, for all of the properties, by registered users 306 and unregistered users 308. The FIG. 3 example report also includes a pie chart of time spent in a session by logged-on and logged-off users (310) and by time period of the day (312).

The login status of the user provides information about whether the user has logged in or not. In the event that the user is not logged in, the user is treated as an "anonymous" user. Tracking login status of the users allows statistics to be derived for logged in users only, for anonymous users only, or for both user groups, and can disclose valuable user behavior information.

The "hotlist" of property locales in portion 314 of the FIG. 3 example report allows an analyst to "drill down" in the report by locale. "Locale" represents a specific group of users for whom a product is intended. Each PageID or Property typically belongs to a particular locale. For a large web page provider, such as Yahoo! Inc. of Sunnyvale, Calif., that does business in several countries, the locales often correspond to the different countries. For example, the Yahoo! Mail product can be made for three locales, such as a Swedish locale, a U.S. locale, and a German locale.

Thus, in on example, whereas the "all properties" report may have been generated by aggregating together the data in the processed files 212 (FIG. 2) for all the locales, the data for a drill-down report for a particular locale may be more directly available from the processed files 212. In a similar manner, the data to report on one particular day (such as Jan. 15, 2004, in the FIG. 3 example) may be directly available from the processed files 212, whereas, to report on a particular month, the data for that report may be generated by aggregating together data in the processed files 212 for all the days in that month. In either case, however, it is not necessary to consult the raw activity data files 206. That is, the computationally-intensive pre-aggregation has resulted in data in pre-processed files for which a mere incremental amount of processing may be done to generate a wide variety of useful reports.

Figure 4:
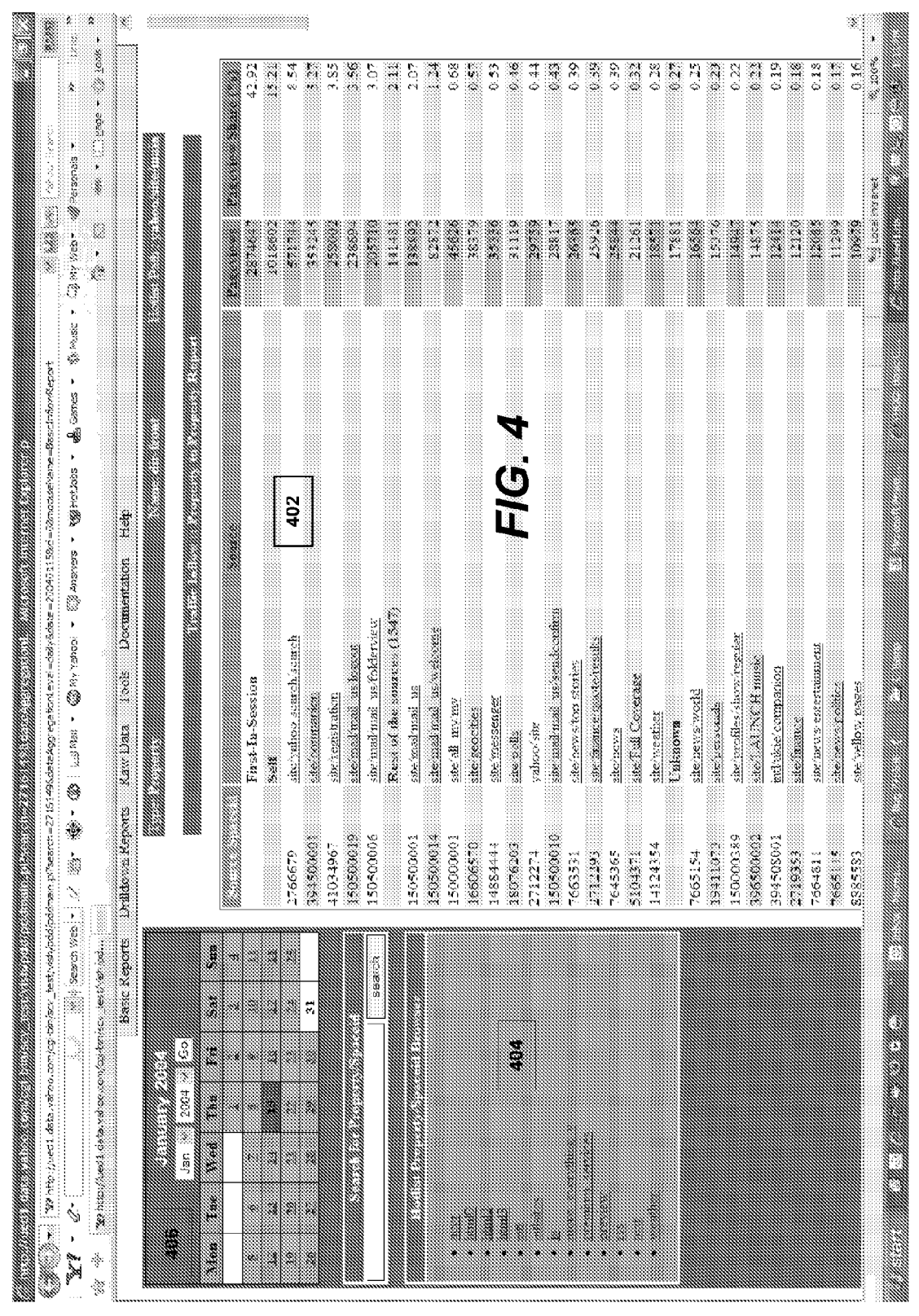

Turning now to another example report, FIG. 4 illustrates data of traffic inflow for a particular page of a particular property—in this case, for the page dir-front of the property located at yahoo/site/main. The report, in portion 402 of the FIG. 4 display, provides (at the top part of portion 402) an indication of page views originating from the site itself. The report, also in portion 402 of the FIG. 4 display, provides (at the bottom part of portion 402) and indication of page views originating from other sites. Furthermore, a particular date for the reported data may be selected using portion 406 of the FIG. 4 report.

The portion 404 of the FIG. 4 report provides a mechanism to "drill down" to particular portions of the yahoo/site/main property. As with the FIG. 3 report, the data for the FIG. 4 report may have been generated by aggregating together data in the processed files 212 for all the portions of the yahoo/site/main property, whereas data for a drill-down report, if a particular portion of the yahoo/site/main property were to be selected from the portion 404 of the FIG. 4 report, may be more directly available from the processed files. Again, it is emphasized that however, it is not necessary to consult the raw activity data files 206. As a result, the computationally-intensive pre-aggregation has resulted in data in pre-processed files for which a mere incremental amount of processing may be done to generate the useful report illustrated in FIG. 4.

Figure 5:
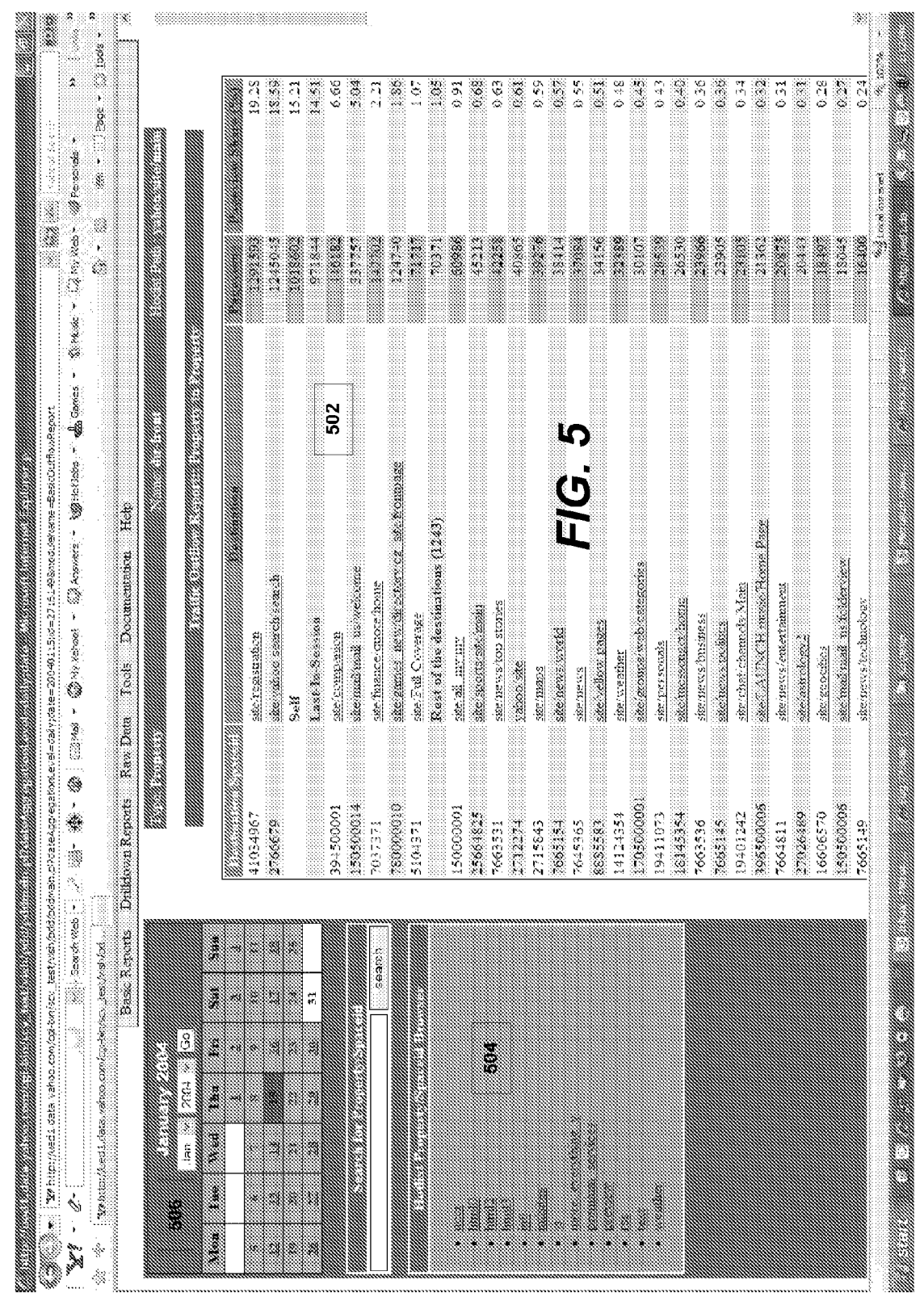

The FIG. 5 report is similar in some respects to the FIG. 4 report, except that the FIG. 5 report illustrates data (502) of traffic outflow from the property, as a whole, located at yahoo/site/main. A particular portion of the yahoo/site/main property may be selected for "drill down" from the portion 504 of the FIG. 5 report. That is, a drill-down report may be generated to illustrate data of traffic outflow from a particular portion of the yahoo/site/main property, as opposed to from the yahoo/site/main property as a whole. Furthermore, a particular date for the reported data may be selected using portion 506 of the FIG. 5 report.

Figure 6:
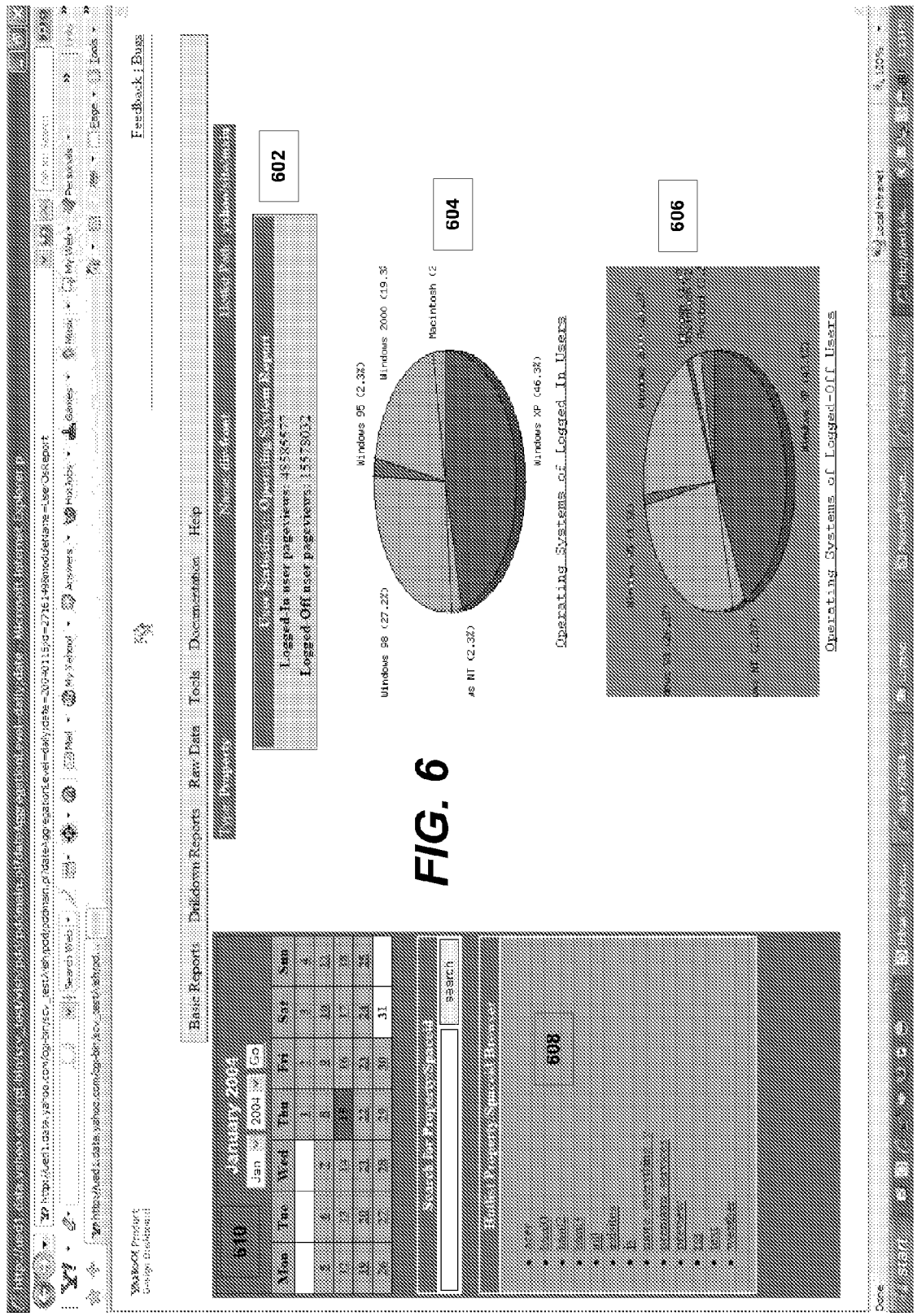
FIG. 6 illustrates a report of data, for both logged-in and logged-off users, of an operating system of those users for the property.

The FIG. 6 report provides data, for both logged-in and logged-off users (602), of the operating system of those users for the property located at yahoo/site/main. The data is presented as a pie chart for logged-in users (604) and logged-off users (606). Furthermore, a particular portion of the yahoo/site/main property may be selected for "drill down" from the portion 608 of the FIG. 6 report. A particular date for the reported data may be selected using the portion 610 of the FIG. 6 report.

Figure 7:
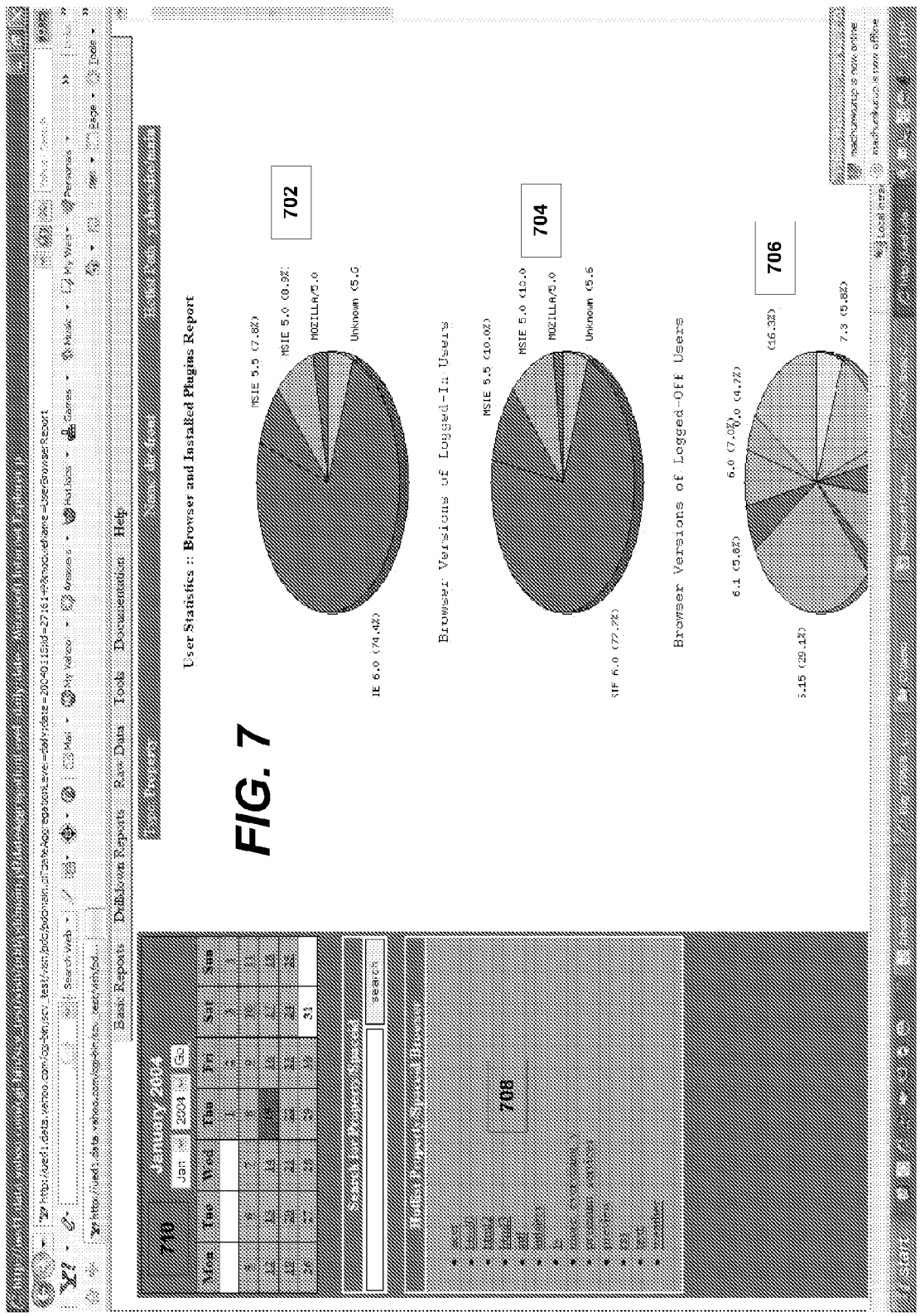
FIG. 7 illustrates a report that is similar to the FIG. 6 report, except that the FIG. 7 report provides data of the browser version of those users for the property.

The FIG. 7 report is similar to the FIG. 6 report, except that it provides data of the browser version of those users for the property located at yahoo/site/main. A particular portion of the yahoo/site/main property may be selected for "drill down" from the portion 708 of the FIG. 7 report.

Figure 8:
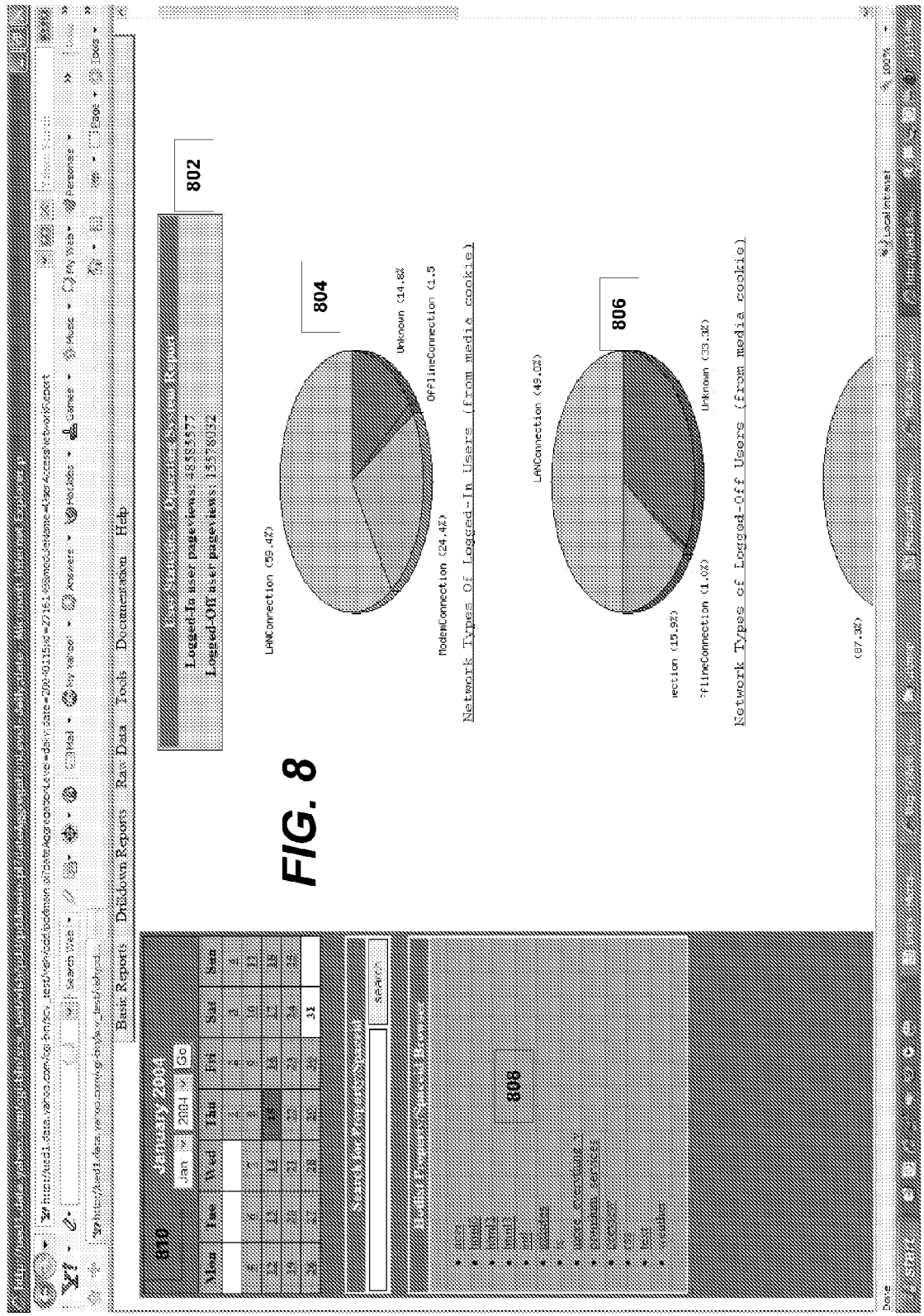
FIG. 8 illustrates a report that is similar to the FIG. 6 report as well, except that the FIG. 7 report provides data of media type of those users for the property.

The FIG. 8 report is similar to the FIG. 6 report as well, except that it provides data of media type of those users for the property located at yahoo/site/main. The "media type" refers to the network type of users accessing the property. A particular portion for the yahoo/site/main property may be selected for "drill down" from the portion 808 of the FIG. 8 report.

Figure 9:
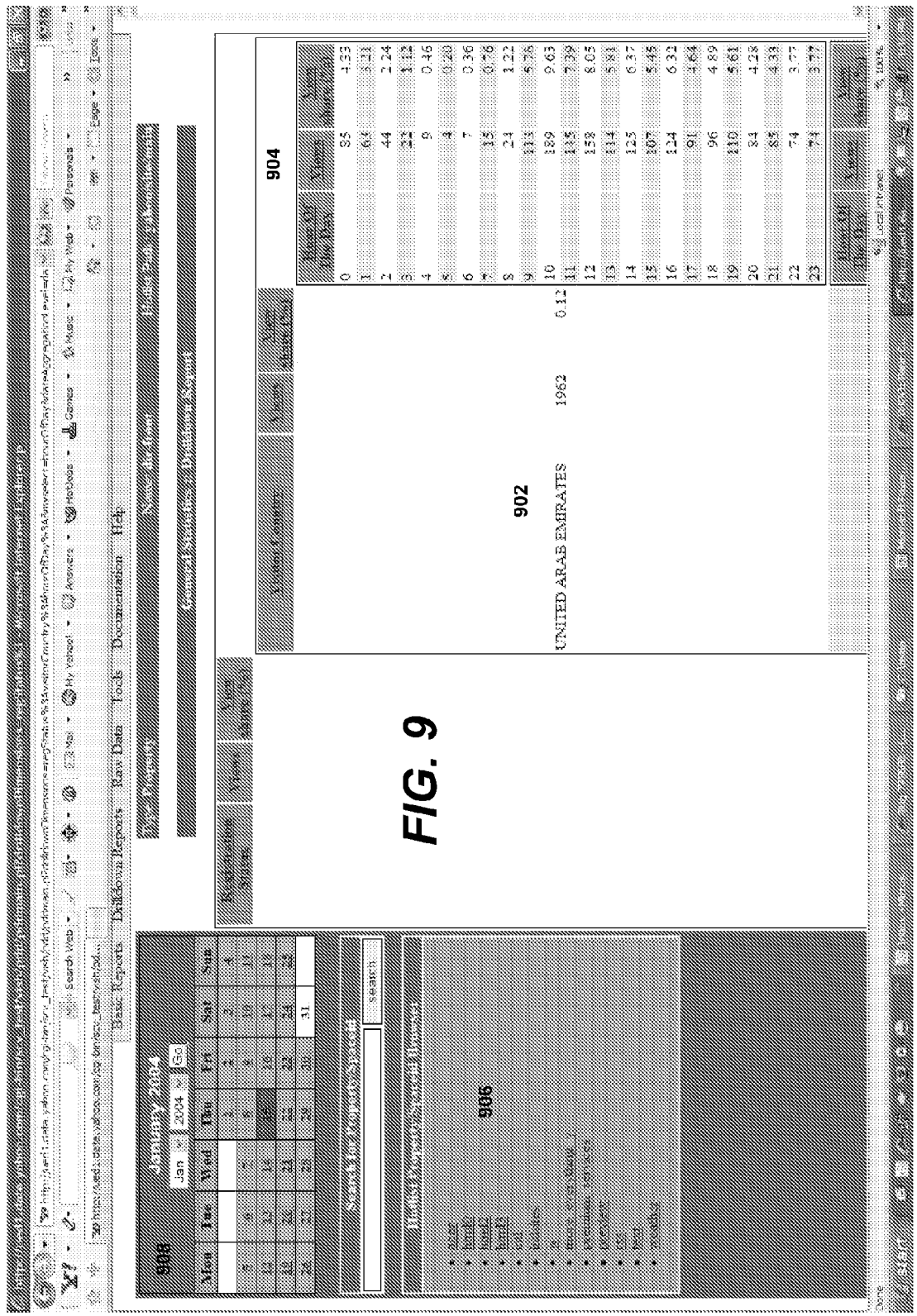
FIG. 9 illustrates a report of "general statistics" for pageviews, similar to that illustrated in FIG. 3, except that the FIG. 9 report illustrates a "drill down" report by visitor country.

Turning now to FIG. 9, this report is a "general statistics" report for pageviews, similar to that illustrated in FIG. 3, except that FIG. 9 illustrates a "drill down" report by visitor country. Specifically, the portion 902 indicates the number of page views for the entire day (Jan. 15, 2004, selected in the portion 908 of the FIG. 9 report display) for visitors from the United Arab Emirates. The portion 904 indicates the number of page views, drilled down by hour of the selected day.

Thus, for example, the processed files 212 (FIG. 2) may include data aggregated by portions of a property, on an hour by hour basis for each country. In this example, the data for the FIG. 9 report may be more directly available than the data for the FIG. 9 report. However, even the data for the FIG. 3 report may be fairly easily aggregated on the fly from the data in the processed files 212 without resort to the raw activity data.

Figure 10:
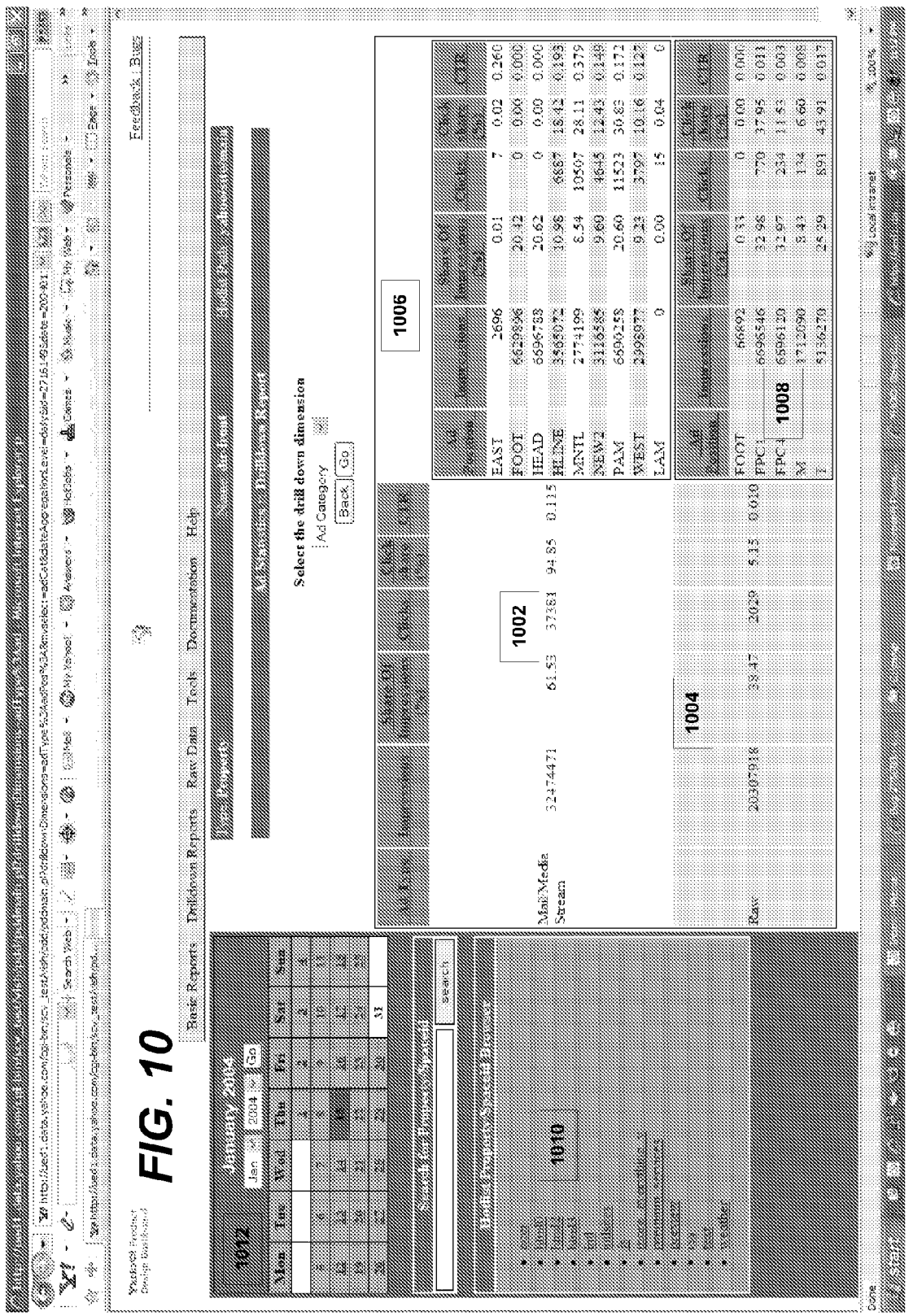
FIG. 10 illustrates a report on statistics for advertisements presented on a property, aggregated by advertisement type, with drill down by advertisement position.

FIG. 10 is a report on statistics for advertisements presented on the yahoo/site/main property. The portions 1002 and 1004 present statistics aggregated by advertisement type, and the portions 1006 and 1008 present statistics "drilled down" by advertisement position. Similar to many of the other illustrated reports, the portion 1010 provides for selection of a particular portion of the yahoo/site/main property on which to report, and the portion 1012 provides for selection of the date for which to report.

Figure 11:
FIG. 11 also illustrates a report on statistics for advertisements presented on a property, but the FIG. 11 report reports on statistics by hour of day, as opposed to by advertisement type.

FIG. 11 is also a report on statistics for advertisements presented on the yahoo/site/main property. In contrast to the FIG. 10 report, the FIG. 11 report reports on statistics by hour of day, as opposed to by advertisement type. The portions 1102 and 1104 present statistics aggregated by hour of the day, and the portions 1106 and 1108 present the statistics "drilled down" by advertisement position.

With FIGS. 10 and 11, similar to that discussed with respect to the reports illustrated in other figures, the reported data may be directly available from the processed files 212 (FIG. 2) or may be available by aggregation on the fly 218 (FIG. 2) with a mere incremental amount of processing over that utilized to generate the processed files 212 from the raw activity data files 206.

A method and architecture has thus been shown to preprocess historical raw transaction data such that the preprocessed data can be minimally further processed, on the fly, to generate additional useful reports in a timely manner. As a result, useful analysis can be carried out efficiently and with computers having only modest processing capability.

What is claimed is:

1. A method of reporting on user behavior relative to particular web pages, the user behavior represented by historical raw transaction data for the users with respect to the web pages, the method comprising:
   processing a collection of the historical raw transaction data, the collection of historical raw transaction data including a plurality of records, each record including data for at least some of a plurality of keys, the keys generally corresponding to types of reports that may be requested, the processing including aggregating the historical raw transaction data according to at least some of the keys, without regard for particular report queries, and storing the aggregated historical raw transaction data,
      wherein aggregating the historical raw transaction data according to at least some of the keys includes, for combinations of values for the at least some of the keys, summarizing the data of the records having those combinations of values of the at least some of the keys and storing the summarized data as the aggregated historical raw transaction data;
   receiving a report query indicating at least one key value that is in addition to any of the combinations of key values according to which the historical raw transaction data was aggregated, and processing the aggregated historical raw transaction data based thereon to further aggregate the aggregated historical raw data; and
   causing a report to be generated based on the result of further aggregating the aggregated historical raw transaction data.

2. The method of claim 1, further comprising:
   receiving a drill down user request indication with respect to a particular item for which user behavior is reported; and
   based on the aggregated historical raw transaction data, individually reporting on activity with respect to sub-items of the particular item.

3. The method of claim 1, wherein:
   the aggregated historical raw transaction data includes historical raw transaction data indicating flow to and from particular web page properties.

4. The method of claim 3, further comprising:
   receiving a drill down user request indication with respect to a particular property for which user behavior is reported; and
   based on the aggregated historical raw transaction data, individually reporting on activity with respect to at least one page of the particular property.

5. The method of claim 4, wherein:
   the drill down user request indication indicates the at least one page.

6. The method of claim 3, wherein:
   the historical raw transaction data indicating flow to and from particular web page properties is aggregated to a page grain of the property.

7. The method of claim 1, wherein:
   the processing includes further aggregating the aggregated historical raw transaction data to a property grain, on the fly in response to the report request.

8. The method of claim 1, wherein:
   the aggregated historical raw transaction data includes data regarding page views for particular web page properties.

9. The method of claim 8, wherein:
   the data regarding page views for particular web page properties is aggregated to a page grain of the properties.

10. The method of claim 1, wherein:
    the aggregated historical raw transaction data includes data relative to activity with respect to advertisements.

11. The method of claim 10, wherein:
    the activity with respect to advertisements includes impressions.

12. The method of claim 10, wherein:
    the activity with respect to advertisements includes activations.

13. The method of claim 10, wherein:
    the data relative to activity with respect to advertisements includes at least one of the group consisting of advertisement position, advertisement category and advertisement type.

14. A system configured to report on user behavior relative to particular web pages, the user behavior originally represented by historical raw transaction data for the users with respect to the web pages comprising:
    computer readable media having aggregated historical raw transaction data stored thereon, the aggregated historical raw transaction data resulting from processing a collection of the historical raw transaction data, the collection of historical raw transaction data including a plurality of records, each record including data for at least some of a plurality of keys, the keys generally corresponding to types of reports that may be requested, the processing including aggregating the historical raw transaction data;
       wherein aggregating the historical raw transaction data according to at least some of the keys includes, for combinations of values for the at least some of the keys, summarizing the data of the records having those combinations of values of the at least some of the keys and storing the summarized data as the aggregated historical raw transaction data;

an on-the-fly query aggregation service configured to further aggregate the aggregated historical raw transaction data, on the fly in response to a report request, the report request indicating at least one key value that is in addition to any of the combinations of key values according to which the historical raw transaction data was aggregated, and a reporting service configured to cause a report to be generated based on the result of further aggregating the aggregated historical raw transaction data.

15. The system of claim 14, wherein the reporting service is further configured to:
receive a drill down user request indication with respect to a particular item for which user behavior is reported; and
based on the aggregated historical raw transaction data, individually report on activity with respect to sub-items of the particular item.

16. The system of claim 14, wherein:
the aggregated historical raw transaction data includes historical raw transaction data indicating flow to and from particular web page properties.

17. The system of claim 16, wherein the reporting service is further configured to:
receive a drill down user request indication with respect to a particular property for which user behavior is reported; and
based on the aggregated historical raw transaction data, individually report on activity with respect to at least one page of the particular property.

18. The system of claim 17, wherein:
the drill down user request indication indicates the at least one page.

19. The system of claim 16, wherein:
the historical raw transaction data indicating flow to and from particular web page properties is aggregated to a page grain of the property.

20. The system of claim 14, wherein:
the on-the-fly query aggregation service configured to further aggregate the aggregated historical raw transaction data is configured to further aggregate the aggregated historical raw transaction data to a property grain, on the fly, in response to the report request.

21. The system of claim 14, wherein:
the aggregated historical raw transaction data includes data regarding page views for particular web page properties.

22. The system of claim 21, wherein:
the data regarding page views for particular web page properties is aggregated to a page grain of the properties.

23. The system of claim 14, wherein:
the aggregated historical raw transaction data includes data relative to activity with respect to advertisements.

24. The system of claim 23, wherein:
the activity with respect to advertisements includes impressions.

25. The system of claim 23, wherein:
the activity with respect to advertisements includes activations.

26. The system of claim 23, wherein:
the data relative to activity with respect to advertisements includes at least one of the group consisting of advertisement position, advertisement category and advertisement type.

27. A computer program product for reporting on user behavior relative to particular web pages, the user behavior originally represented by historical raw transaction data for the users with respect to the web pages, the computer program product comprising at least one computer-readable medium having computer program instructions stored therein which are operable to cause at least one computing device to:
on-the-fly, in response to a report request, further aggregate already-aggregated historical raw transaction data, wherein the collection of historical raw transaction data including a plurality of records, each record including data for at least some of a plurality of keys, the keys generally corresponding to types of reports that may be requested and the already-aggregated historical raw transaction data is a result of processing a collection of the historical raw transaction data, including aggregating the historical raw transaction data according to at least some of the keys, without regard for particular report requests,
wherein aggregating the historical raw transaction data according to at least some of the keys includes, for combinations of values for the at least some of the keys, summarizing the data of the records having those combinations of values of the at least some of the keys and storing the summarized data as the aggregated historical raw transaction data; and
cause a report to be generated based on the result of further aggregating the aggregated historical raw transaction data.

28. The computer program product of claim 27, wherein the computer program instructions are further operable to cause the at least one computing device to:
receive a drill down user request indication with respect to a particular item for which user behavior is reported; and
based on the aggregated historical raw transaction data, individually report on activity with respect to sub-items of the particular item.

29. The computer program product of claim 27, wherein:
the aggregated historical raw transaction data includes historical raw transaction data indicating flow to and from particular web page properties.

30. The computer program product of claim 27, wherein the computer program instructions are further operable to cause the at least one computing device to:
receive a drill down user request indication with respect to a particular property for which user behavior is reported; and
based on the aggregated historical raw transaction data, individually report on activity with respect to at least one page of the particular property.

31. The computer program product of claim 30, wherein:
the drill down user request indication indicates the at least one page.

32. The computer program product of claim 29, wherein:
the historical raw transaction data indicating flow to and from particular web page properties is aggregated to a page grain of the property.

33. The computer program product of claim 27, wherein:
the on-the-fly query aggregation is configured to further aggregate the aggregated historical raw transaction data to a property grain, on the fly, in response to the report request.

34. The computer program product of claim 27, wherein:
the aggregated historical raw transaction data includes data regarding page views for particular web page properties.

35. The computer program product of claim 34, wherein:
the data regarding page views for particular web page properties is aggregated to a page grain of the properties.

36. The computer program product of claim 27, wherein:
the aggregated historical raw transaction data includes data relative to activity with respect to advertisements.

37. The computer program product of claim 36, wherein:
the activity with respect to advertisements includes impressions.

38. The computer program product of claim 36, wherein:
the activity with respect to advertisements includes activations.

39. The computer program product of claim 36, wherein:
the data relative to activity with respect to advertisements includes at least one of the group consisting of advertisement position, advertisement category and advertisement type.

\* \* \* \* \*

UNITED STATES PATENT AND TRADEMARK OFFICE
CERTIFICATE OF CORRECTION

PATENT NO. : 7,533,130 B2
APPLICATION NO. : 11/612994
DATED : May 12, 2009
INVENTOR(S) : Narayana et al.

It is certified that error appears in the above-identified patent and that said Letters Patent is hereby corrected as shown below:

Col. 3, lines 32-51, change "Attributes
　　　　　　　　　　　　Source pageid
　　　　　　　　　　　　Dest pageid (for flow reports)
　　　　　　　　　　　　Registration information
　　　　　　　　　　　　Hour of the day
　　　　　　　　　　　　User country
　　　　　　　　　　　　User screen resolution (for user media information)
　　　　　　　　　　　　Network type (for user media information)
　　　　　　　　　　　　Media player versions (for user media information)
　　　　　　　　　　　　Browser (for user media information)
　　　　　　　　　　　　Operating system (for user media information)
　　　　　　　　　　　　Ad position (for ad drilldown reports)
　　　　　　　　　　　　Ad category (for ad drilldown reports)
　　　　　　　　　　　　Ad type (for ad drilldown reports)
　　　　　　　　　　　　Metrics
　　　　　　　　　　　　Total Pageviews
　　　　　　　　　　　　Total Unique cookies
　　　　　　　　　　　　Total timespent
　　　　　　　　　　　　Total ad views (for ad drilldown reports)
　　　　　　　　　　　　Total ad clicks (for ad drilldown reports)"

to　　--<u>Attributes</u>
- Source pageid
- Dest pageid (for flow reports)
- Registration information
- Hour of the day
- User country
- User screen resolution (for user media information)
- Network type (for user media information)
- Media player versions (for user media information)
- Browser (for user media information)
- Operating system (for user media information)
- Ad position (for ad drilldown reports)
- Ad category (for ad drilldown reports)
- Ad type (for ad drilldown reports)

UNITED STATES PATENT AND TRADEMARK OFFICE
CERTIFICATE OF CORRECTION

PATENT NO. : 7,533,130 B2
APPLICATION NO. : 11/612994
DATED : May 12, 2009
INVENTOR(S) : Narayana et al.

It is certified that error appears in the above-identified patent and that said Letters Patent is hereby corrected as shown below:

Metrics
          • Total Pageviews
          • Total Unique cookies
          • Total timespent
          • Total ad views (for ad drilldown reports)
          • Total ad clicks (for ad drilldown reports)--

Col. 3, line 59
to Col. 4, line 20,    change "Flow Reports
Source pageid
Dest pageid (for flow reports)
Registration information
Hour of the day
User country
General Reports
Source pageid
Registration information
Hour of the day
User country
User Media Profile Reports
Source pageid
Registration information
Hour of the day
User country
User screen resolution (for user media information)
Network type (for user media information)
Media player versions (for user media information)
Browser (for user media information)
Operating system (for user media information)
Ad Drill Down Reports.
Source pageid
Registration information
Hour of the day
User country
Ad position (for ad drilldown reports)
Ad category (for ad drilldown reports)
Ad type (for ad drilldown reports)"

UNITED STATES PATENT AND TRADEMARK OFFICE
CERTIFICATE OF CORRECTION

PATENT NO. : 7,533,130 B2
APPLICATION NO. : 11/612994
DATED : May 12, 2009
INVENTOR(S) : Narayana et al.

It is certified that error appears in the above-identified patent and that said Letters Patent is hereby corrected as shown below:

to --<u>Flow reports</u>
- Source pageid
- Dest pageid (for flow reports)
- Registration information
- Hour of the day
- User country <u>General reports</u>
- Source pageid
- Registration information
- Hour of the day
- User country <u>User media profile reports</u>
- Source pageid
- Registration information
- Hour of the day
- User country
- User screen resolution (for user media information)
- Network type (for user media information)
- Media player versions (for user media information)
- Browser (for user media information)
- Operating system (for user media information)

<u>Ad drill down reports</u>
- Source pageid
- Registration information
- Hour of the day
- User country
- Ad position (for ad drilldown reports)
- Ad category (for ad drilldown reports)
- Ad type (for ad drilldown reports)--

UNITED STATES PATENT AND TRADEMARK OFFICE
CERTIFICATE OF CORRECTION

PATENT NO. : 7,533,130 B2
APPLICATION NO. : 11/612994
DATED : May 12, 2009
INVENTOR(S) : Narayana et al.

It is certified that error appears in the above-identified patent and that said Letters Patent is hereby corrected as shown below:

Col. 4, line 27-41    change   "Flow Reports
Total Pageviews
Total Unique Cookies
Average pageviews per cookie
General Reports
Total Pageviews
Total timespent
Average pageviews per cookie
Average timespent per cookie
User Media Profile Reports
Total Pageviews
Average pageviews per cookie
Ad Drill Down Reports.
Total ad views (for ad drilldown reports)
Total ad clicks (for ad drilldown reports)"

to    --Flow reports
- Total Pageviews
- Total Unique Cookies
- Average pageviews per cookie General reports
- Total Pageviews
- Total timespent
- Average pageviews per cookie
- Average timespent per cookie User media profile reports
- Total Pageviews
- Average pageviews per cookie

UNITED STATES PATENT AND TRADEMARK OFFICE
CERTIFICATE OF CORRECTION

PATENT NO.         : 7,533,130 B2
APPLICATION NO. : 11/612994
DATED                 : May 12, 2009
INVENTOR(S)       : Narayana et al.

It is certified that error appears in the above-identified patent and that said Letters Patent is hereby corrected as shown below:

<u>Ad drill down reports</u>
• Total ad views (for ad drilldown reports)
• Total ad clicks (for ad drilldown reports)--

Signed and Sealed this

Fifteenth Day of September, 2009

David J. Kappos
*Director of the United States Patent and Trademark Office*